United States Patent [19]

Godfried

[11] Patent Number: 5,011,584
[45] Date of Patent: Apr. 30, 1991

[54] METHOD FOR SEPARATING A PREDETERMINED ISOTOPE OF AN ELEMENT FROM A GASEOUS COMPOUND CONTAINING SAID ELEMENT

[75] Inventor: Herman P. Godfried, Delden, Netherlands

[73] Assignee: Ultra-Centrifuge Nederland N.V., Almelo, Netherlands

[21] Appl. No.: 401,242

[22] Filed: Aug. 31, 1989

[30] Foreign Application Priority Data

Sep. 1, 1988 [NL] Netherlands .................... 8802160

[51] Int. Cl.⁵ .............................................. B01D 5/00
[52] U.S. Cl. .............................. 204/157.22; 204/157.2
[58] Field of Search ........... 204/157.2, 157.21, 157.22; 250/423 P; 307/425

[56] References Cited

U.S. PATENT DOCUMENTS

| | | | |
|---|---|---|---|
| 4,020,350 | 4/1977 | Ducas | 250/423 P |
| 4,061,921 | 12/1977 | Cantrell et al. | 250/423 P |
| 4,188,538 | 2/1980 | Diels | 250/423 P |
| 4,297,600 | 10/1981 | Trutna, Jr. | 307/426 |
| 4,361,770 | 11/1982 | Rabinowitz et al. | 307/426 |
| 4,493,086 | 1/1985 | Jain et al. | 372/21 |
| 4,690,742 | 9/1987 | Cantrell et al. | 204/157.2 |

*Primary Examiner*—Brooks H. Hunt
*Assistant Examiner*—Ngoclan T. Mai
*Attorney, Agent, or Firm*—Cushman, Darby & Cushman

[57] ABSTRACT

Isotopes of an element are separated using a method in which a gaseous compound containing said element is brought into a condition in which the molecules of the compound are in the ground vibrational state, and the molecules containing the pre-determined isotope are selectively excited by means of a source of radiation. The selectively excited molecules are further excited, and/or directly dissociated, using at least a second source of radiation, including at least two laser beams which are converted using so-called "four-wave mixing" in a Raman cell. One of the laser beams is a high-energy beam that is a train of very short pulses.

8 Claims, 1 Drawing Sheet

METHOD FOR SEPARATING A PREDETERMINED ISOTOPE OF AN ELEMENT FROM A GASEOUS COMPOUND CONTAINING SAID ELEMENT

BACKGROUND OF THE INVENTION

This invention relates to a method of separating isotopes of an element, which comprises bringing a gaseous compound of the element into a condition in which the molecules of the compound are in one well-defined vibrational state, and selectively exciting the molecules containing the pre-determined isotope by means of a source of radiation, and further exciting, and/or directly dissociating, said selectively excited molecules by means of at least a second source of radiation, using at least two laser beams which are converted using so-called "four-wave mixing" in a Raman cell. The invention further relates to apparatus for the application of the method. A method and apparatus of this kind are disclosed in the article in Il Nuovo Cimento, Vol. 6D, N. 6, Dec. 1985, pp 559-566. More specifically the article describes how, by means of "four-wave mixing" the efficiency of the conversion of the laser beam necessary for the selective excitation of molecules of uranium hexafluoride containing the isotope, $U^{235}$, is increased. An increase of the efficiency of conversion leads to an increase of the efficiency of the enrichment of uranium.

The method of enriching uranium described in the above article can be briefly explained further as follows.

The molecules of the gas, uranium hexafluoride, consist as to 0.7% of $^{235}UF_6$ and as to 99.3% of $238UF_6$. Owing to the difference in mass between the two isotopes, there is a difference in frequency of internal vibration modi in molecules containing either the one or the other isotope; this is a so-called isotope shift. Now, by shining (laser) light of a suitable wavelength on to the gas, it is possible to selectively excite molecules containing one isotope (in practice always $^{235}UF_6$) into a vibration mode whose frequency exactly matches that of the laser light, whereas molecules containing the other isotope are excited with a much lower probability, if at all. The wavelength suitable therefor is in the infrared at about 15.92 $\mu$m. The selectively excited molecules should subsequently be removed from the gas or the gas stream in which they are contained, before there is actual separation or enrichment. This is effected in a next step or steps, in which the molecules are excited further to such a high vibration mode that the molecule becomes unstable and disintegrates or dissociates. Further excitation can again be effected by means of laser radiation.

In the prior method, and also in a comparable prior method described in an article in Optics Letters, Vol. 7, No 5, pp 212-214, the first source of radiation needed to effect the first selective excitation of the $UF_6$ is a so-called Raman shifter. This is a cell filled with, in this case, hydrogen, into which the light from a $CO_2$ laser ($\lambda = 10.178$ $\mu$m) is sent. Through a non-linear interaction with the material system (here the hydrogen gas, therefore), the light from the $CO_2$ laser is converted into light having the desired wavelength of 15.92 $\mu$m. This process is called Stimulated Raman Scattering. The frequency of the 10 $\mu$m and 16 $\mu$m beams are related to each other as follows $$\nu_{10} - \nu_{16} = \nu_{0-2}$$

(1)

In this equation, $\nu_{0-2}$ is the frequency of a rotational transition in the hydrogen molecule which takes place during the scattering process. This rotational transition of the molecule, characterized by rotational quantum numbers of 0 and 2, has a given fixed frequency (354.33 cm$^{-1}$) and by virtue of relation (1) this fixes the difference in frequency between incoming and outgoing radiation. What happens, therefore, is that the incoming radiation re-emerges from the cell shifted in frequency, which accounts for the name Raman shifter. It is further noted that, in order to achieve Raman conversion, a certain minimum intensity is required for the pump beam $\nu_1$. This depends on the scattering medium, the specific transition in the medium, and the incident frequency $\nu_1$. A term often used in the literature in this connection is a conversion threshold value. For the relatively long wavelength of the $CO_2$ light, the conversion process turns out to be rather weak, i.e., a very high intensity beam of $CO_2$ light must be shone. into the Raman cell for there to be any degree of conversion. For an industrial process, where the non-converted light from the $CO_2$ beam can be regarded as waste, it is of course extremely important, from the point of view of efficiency, to achieve as high a conversion as possible. This means that the aim should be for a method which makes the overall efficiency of the enrichment process as high as possible. In the prior method, the efficiency is increased by using so called "four-wave mixing". As the name implies, this involves 4 waves, say with frequencies of $\nu_1$, $\nu_{1s}$, $\nu_2$, $\nu_{2s}$. In this case, $\nu_1$, $\nu_2$ mean the frequencies of two $CO_2$ light beams at 10.178 and 10.2 $\mu$m, respectively, and $\nu_{1s}$, $\nu_{2s}$ mean the appurtenent Raman-shifted frequencies:

$$\nu_1 - \nu_{1s} = \nu_2 - \nu_{2s} = \nu_{0-2}$$

(2)

In the present case, beam 1 (frequency $\nu_1$) has such a low intensity that there is hardly, if at all, any Raman conversion, for the high intensity required for conversion can hardly, if at all be achieved, because rather high requirements must be imposed upon the frequency $\nu_{1s}$ (for the selective excitation) and hence upon the frequency $\nu_1$ of the $CO_2$ laser, (which could mean, for example, that a large number of optical elements, each by itself giving a loss, must be disposed in the $CO_2$ laser oscillation cavity). If now, together with beam 1 beam 2 is shone into the cell (i.e., overlapping in both space and time), and this second beam does have an intensity sufficiently high for Raman conversion, then, owing to the four-wave mixing process, beam 1 can begin to convert as well. The efficiency with which beam 1 is converted is virtually equal to that of beam 2. The resulting beams (frequencies $\nu_{1s}$, $\nu_{2s}$) are thereafter used (or selective first excitation ($\nu_{1s}$) and subsequent excitation ($\nu_{2s}$). As no stringent requirements are imposed upon $\nu_2$, a relatively simple $CO_2$ laser, e.g., of the TEA type can be used here.

SUMMARY OF THE INVENTION

It is an object of the present invention to further improve the prior method and to provide a method in which, specifically, the threshold value for the Raman conversion is lower, while a higher efficiency is achieved. A further object is to provide apparatus by means of which the method according to the invention can be used, more particularly for the separation of uranium isotopes.

The objects contemplated are achieved, according to the invention, by a method which comprises using laser beams for the four-wave mixing process, one of which is a high-energy beam consisting of a train of very short pulses. The apparatus according to the invention is suitable for the separation of uranium isotopes, which, as conventional, comprises a first and a second $CO_2$ lasers the exit beams of which are directed to a parahydrogen Raman cell disposed behind the $CO_2$ lasers, in which Raman cell the laser beams are brought to "four-wave mixing" in operation, is characterized in that in one of the $CO_2$ lasers, which is high-intensity laser, a so-called "mode locker" is arranged.

The method according to the invention comprises in essence the combination of the four-wave mixing process and the use of a high-energy laser beam, the beam of which consists of a train of very short pulses.

The high-intensity laser always provides only a short pulse (from the pulse train) in the Raman medium. It would be expected that the field of such a short pulse is not present long enough and cannot be active long enough to proceed to efficient conversion. If, however, the distance between successive pulses is selected so short, and hence the repetition frequency so high, that the response of the medium is not yet finished when the next pulse arrives, conversion turns out to be possible after all, and is found to be highly efficient at that, even more efficient than of a long pulse with the same energy content. In view of the higher gain, the conversion by Raman shift of a high-energy $CO_2$ beam ($\nu_2$) consisting of a train of very short pulses, has a lower threshold value and accordingly can take place at a lower average power. The advantage is that a smaller $CO_2$ laser may be used. In addition is required a smaller tunable $CO_2$ laser ($\nu_1$) which converts by four-wave mixing. Although the pulses do not fully overlap now, four-wave mixing conversion can proceed normally, even in the time between the pulses $\nu_2$ when the high-intensity laser is "off", as the medium has a certain finite response time. It is thus achieved that the threshold value for the high intensity laser is reduced, and also the four-wave mixing conversion of the lower-intensity laser continues.

Another advantage of the method according to the invention is that a train of very high-intensity pulses is generated at frequency $\nu_{2s}$. In the case of uranium enrichment, this train of pulses can now be used to effect the higher excitation of the once-excited $^{235}UF_6$ molecules. As, however, this is a multi-step, multi-photon process, the intensity dependency of the efficiency of the process is much stronger than linear. This means that the multi-photon dissociation (MPD) or multi-photon excitation (MPE) proceed much better with a train of short high-intensity pulses than with one long pulse of the same average intensity. This is a clear improvement relative to the situation where a long pulse is used. The efficiency can be enhanced further by a suitable selection of the pulse repetition frequency. This is based upon the fact that the spectrum of a train of short pulses consists of a number of discrete frequencies spaced apart a distance of $1/\Delta t$, with $\Delta t$ being the pulse repetition period, i.e. the period from the beginning of a pulse in the train to the beginning of the next pulse. Now, by selecting a suitable repetition period, the frequency spectrum can be so adapted that the MPD or MPE is multi-resonant, i.e., that various frequency components exactly match a transition in the $UF_6$.

Accordingly, in a suitable embodiment of the method according to the invention, through suitable adjustment of the pulse repetition time, the Fourier spectrum of the pulses in the pulse train is so selected that one or more Fourier components is resonant with one or more transitions of the selectively excited molecules.

BRIEF DESCRIPTION OF THE DRAWING

The invention will now be elucidated with reference to the accompanying drawings, in which.

DETAILED DESCRIPTION

Figure 1:
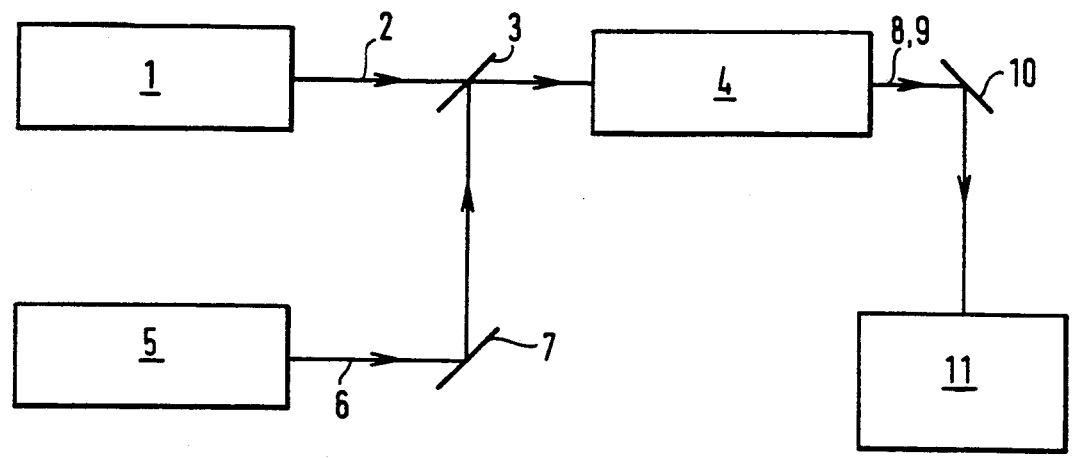
FIG. 1 is a schematic representation of one embodiment of the apparatus according to the invention.

FIG. 1 schematically shows one embodiment of the apparatus according to this invention. This embodiment comprises a first $CO_2$ laser 1 which provides a laser beam 2, for example, with a wavelength $\lambda = 10.178$ $\mu m$. The beam 2 is directed through a partially transmitting mirror 3 at the Raman parahydrogen cell 4. The apparatus further comprises $CO_2$ laser 5, providing a laser beam 6, consisting of a series of high-energy, very short pulses with a wavelength of, for example, 10.2 $\mu m$. The beam 6 is also directed to the Raman cell 4 through a mirror 7 and mirror 3.

In Raman cell 4, Raman scattering takes place; as a result of which beam 6 is converted into beam 9. Through four-wave mixing, beam 2 is now converted to beam 8. Beams 8 and 9 are directed via a mirror 10 to the enrichment plant 11. Beam 8 has obtained the desired wavelength of 15.92 $\mu m$, suitable for selectively exciting $^{235}UF_6$. Beam 9, which consists of a train of pulses (it is the converted beam 6) has, for example, a wavelength of about 16 $\mu m$, suitable for further excitation to dissociation the selectively excited $^{235}UF_6$. The further excitation can of course also be realized otherwise. It is noted that the selective excitation of the $^{235}UF_6$ in the uranium hexafluoride in plant 11 requires that the molecules are all in one well-defined state of vibration. This is achieved, for example, by allowing the molecules to expand in a gas expansion through a nozzle together with a carrier gas (for example, a noble gas). The temperature in the expansion is then rapidly reduced and it is thus achieved that all molecules are in the ground vibration state. When this is omitted, and laser beam 8 is shone direct into, for example, a vessel containing gas at room temperature, there can be no selective excitation, as in that case molecules already thermally excited will also begin to absorb with slightly shifted absorption frequency, including molecules containing the heavy isotope 238u.

Figure 2:
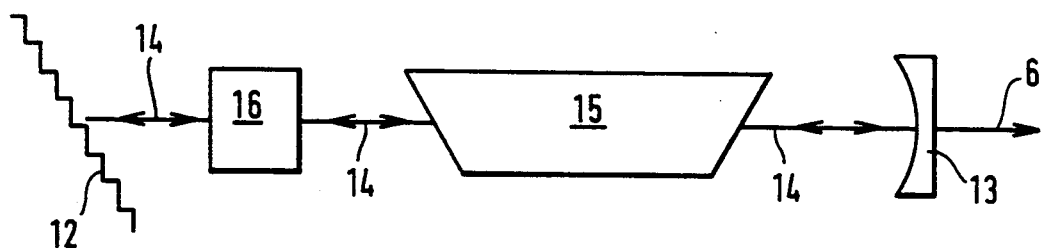
FIG. 2 is a schematic representation of a detail of the apparatus shown in the FIG. 1.

In Fig 2, the $CO_2$ laser 5 of the embodiment of FIG. 1 is shown schematically in more detail. Laser 5, which is productive of a beam built up from a train of short high-energy pulses, comprises a grating 12 and an exit mirror 13, between which a beam 14 is reflected, which beam is intensified during its passage through the intensifying medium 15. All this is conventional for a $CO_2$ laser. Further included in laser 5 is a mode locker 16. As a result of the use of mode locker 16, the beam 6 ultimately exiting from laser 5 is a train of pulses. Mode locker 16 may for example consist of a radio-frequency source plus intensifier with a total output power of 25 W. This power is supplied through a (piezoelectric) transducer mounted on a germanium (Ge) crystal in the laser cavity. In the crystal, standing accoustic waves are generated. The variations in index of refraction generated by the variations in density operate as a grating for the $CO_2$ light, which is scattered by it. It is only at moments when the variations are zero (i.e., the zero passages of the sinusoidal drive) that no scattering takes place. In this way, a pulsed output is obtained with a repetition time equal to the circulation time of the light in the laser resonator. The radio frequency source should therefore be operated at half the repetition frequency.

In one embodiment of the apparatus according to the invention, the mode-locked $CO_2$ laser had an output beam with a repetition frequency of 100 MHz. The pulse width was 1-2 ns and the peak intensity 10 MW. The pulse energy was 5 mJ. The $CO_2$ laser transition was 10 R (18) with a frequency of 974.6 cm$-1$.

After intensification in a TEA intensifier, the peak intensity was 100 MW and the pulse energy 50 mJ. The total energy in the laser pulse was 3J.

For the treatment of uranium hexafluoride, a selective excitation frequency of 628.3 cm$^{-1}$ was used and a subsequent excitation frequency of 620.3 cm$^{-1}$. The gas temperature was maintained at 70±20 K and the total gas pressure of $UF_6$ and the carrier gas, consisting of argon, at 0.01 atm.

Under the above conditions, good results were achieved.

The advantage of the method and apparatus according to the invention is that a lower threshold intensity for conversion is achieved as it has been found that the threshold value for the conversion of a train of pulses is lower than for a more or less continuous, i.e., long pulse. A further advantage is that the multi-photon processes have a higher probability owing to the higher intensity peaks in the pulse train.

I claim:

1. A method for separating a predetermined isotope of an element from a gaseous compound containing said element in which at least two isotopes of the element are present, comprising:
   (a) providing a supply of said gaseous compound substantially all molecules of said compound are in one vibration state;
   (b) providing at least two laser beams respectively for selectively exciting and further exciting molecules of said compound which contain the predetermined isotope, including interposing a medium-containing Raman cell between sources of the respective laser beams and said supply of gaseous compound and thereby converting the frequencies of said laser beams to different respective output frequencies by means of said Raman cell relative to the frequencies of said laser beams had as inputs to said cell; one of said laser beams as input to said cell being a train of very short pulses with a respective distance between each successive two such pulses, said distance being so short, and therefore pulse repetition frequency being so high, whereby the response of the medium in the Raman cell to the arrival of each said pulse in the cell is unfinished when the respective next said pulse arrives in the cell; and
   (c) removing from said supply the predetermined isotope contained in said further excited molecules.

2. The method of claim 1, wherein:
in step (a) said one vibration state is the ground vibration state.

3. The method of claim 1, wherein:
step (b) includes adjusting the pulse repetition frequency of said one laser beam so as to provide a Fourier spectrum of the pulses in which at least one Fourier component is resonant with at least one transition of said selectively excited molecules.

4. The method of claim 1, wherein:
said molecules containing said predetermined isotope are molecules of $^{235}UF_6$.

5. The method of claim 1, wherein:
in step (b) said laser beams so further excite said molecules containing said predetermined isotope as to cause said further excited molecules to dissociate.

6. The method of claim 1, wherein:
in step (b) the medium-containing Raman cell is a para-hydrogen Raman cell.

7. The method of claim 1, wherein:
said molecules containing said predetermined isotope are molecules of $^{235}UF_6$;
in step (b) the medium-containing Raman cell is a para-hydrogen Raman cell;
said laser beam for selectively exciting molecules containing said predetermined isotope has an output wavelength from said cell of 15.92 μm and said one laser beam for further exciting molecules containing said predetermined isotope has an output wavelength from said cell of about 16 μm; and
in step (b) said laser beam so further excites said molecules containing said predetermined isotope as to cause said further excited molecules to dissociate.

8. The method of claim 1, wherein:
in step (b), said one laser beam is provided by a $CO_2$ laser in which a mode locker is provided, for causing the respective laser beam to be provided as said train of very short pulses.

* * * * *